Aug. 24, 1937.   L. D. KAY   2,090,870
VEHICLE WHEEL
Filed Sept. 21, 1935   2 Sheets—Sheet 2
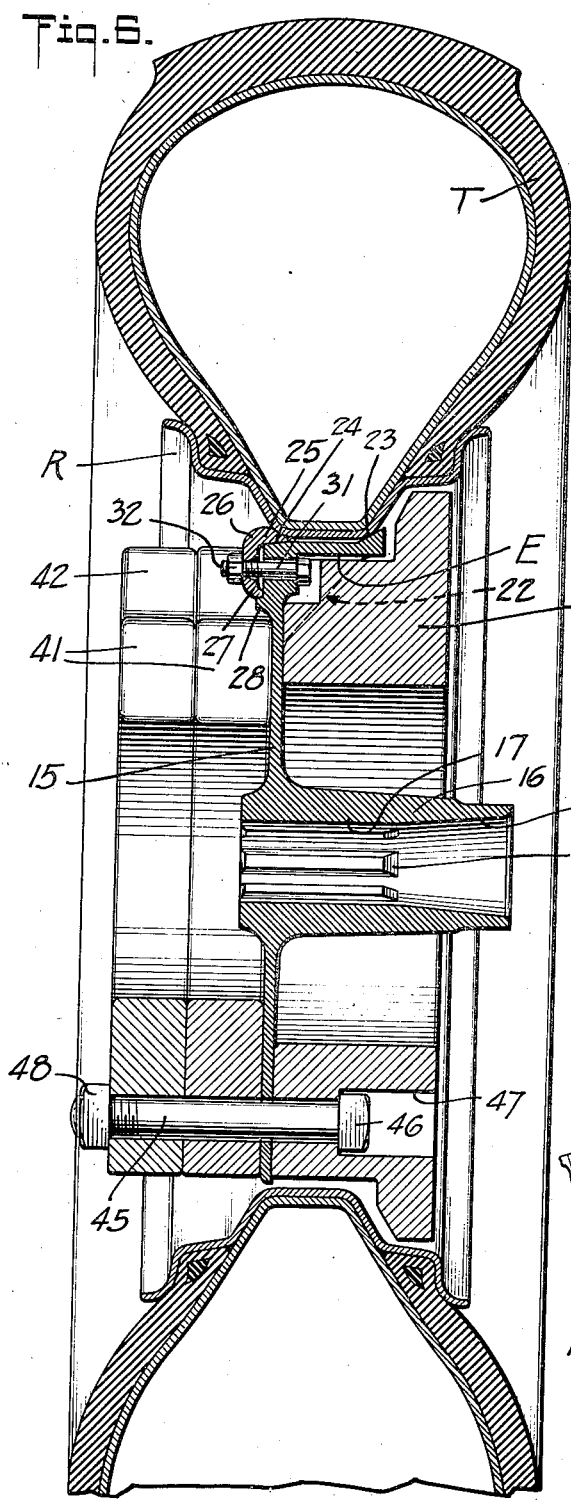
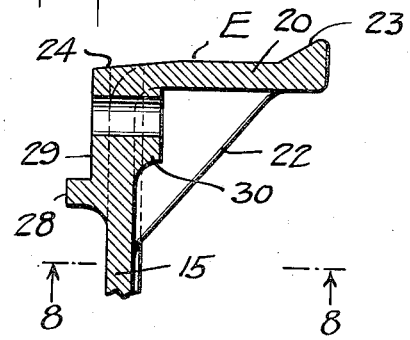
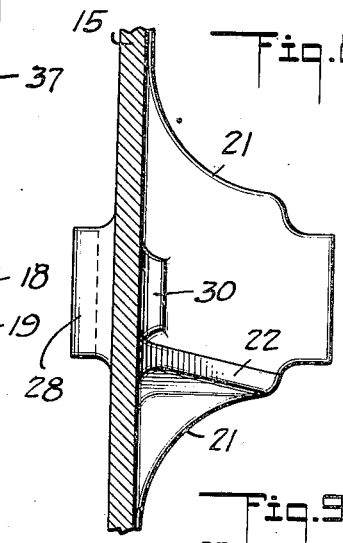
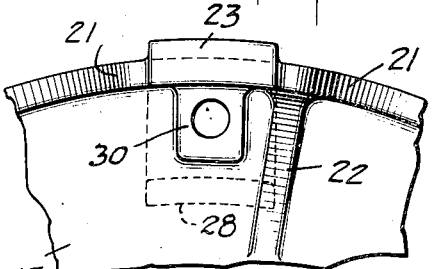
INVENTOR
LLOYD D. KAY
BY
Edwin D. Jones,
ATTORNEY Patented Aug. 24, 1937

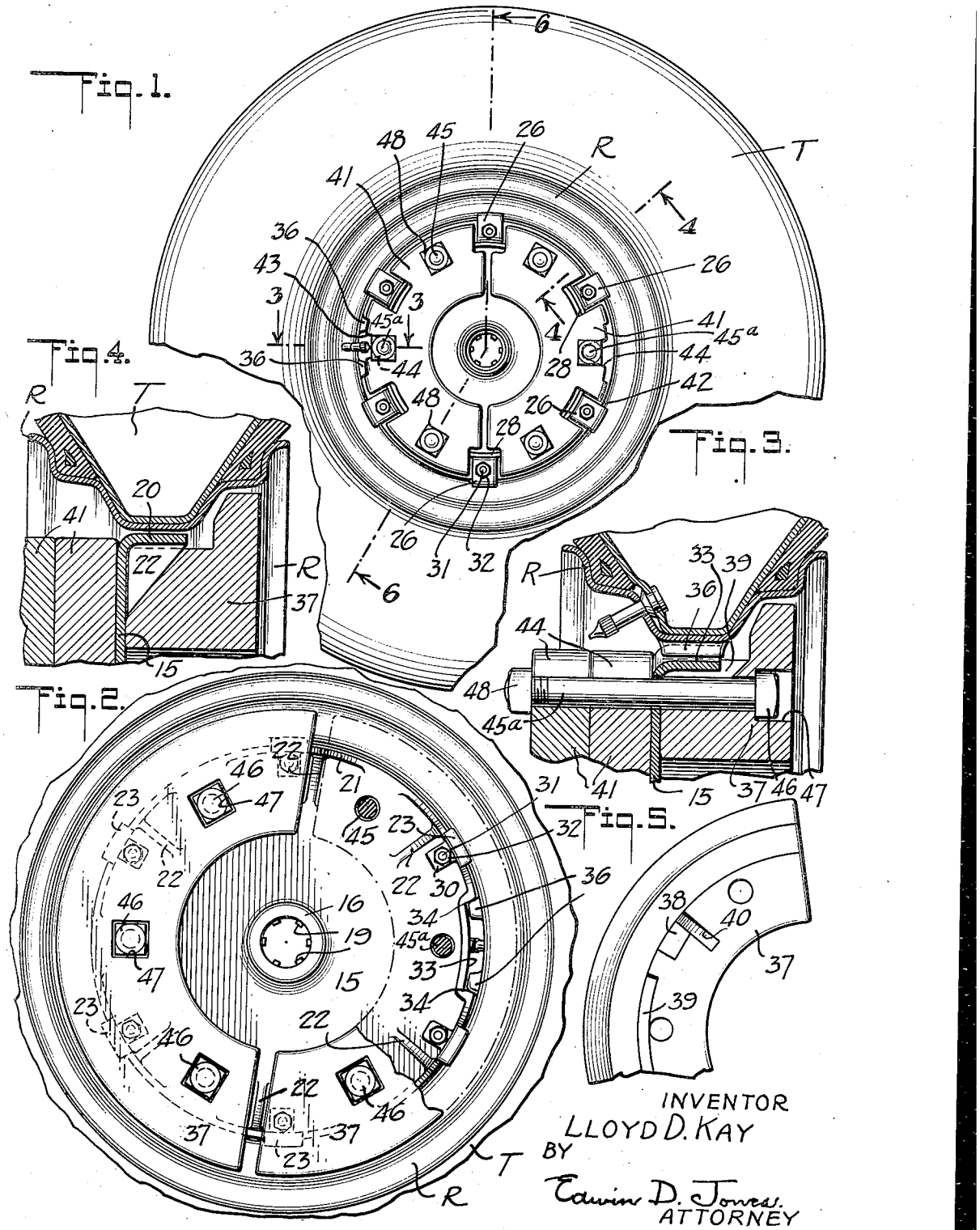

2,090,870

UNITED STATES PATENT OFFICE 2,090,870

VEHICLE WHEEL

Lloyd D. Kay, Alhambra, Calif., assignor to Kay-Brunner Steel Products Inc., a corporation Application September 21, 1935, Serial No. 41,585

8 Claims. (Cl. 301—41)

My invention relates to wheels for vehicles, and it has particular reference, although not necessarily, to tractor wheels equipped with pneumatic tires and traction varying means.

It is a purpose of my invention to provide a tractor wheel having thereon traction weights removable to vary the traction of the wheel, and a pneumatic tire carrying rim which is demountable without the necessity of removing or in any other manner disturbing the original position of the traction weights, whereby the tire can be removed in the event of a requisite tire change, without the laborious operation of removing the traction weights from the wheel.

It is also a purpose of my invention to provide a wheel having a felly upon which a tire carrying rim is removably supported, and which felly is characterized structually by being composed of a plurality of elements extending laterally from the wheel body and spaced circumferentially thereon, and characterized functionally by supporting the tire rim on the wheel so that the tire carried by the rim is properly and uniformly spaced from the side of a vehicle body to which the wheel is applied, and to facilitate application and removal of the tire rim even though the tire rim may be ovate or otherwise untrue in its roundness.

A further purpose of my invention is the provision of a wheel of the character above described in which the traction weights are sectional to facilitate application to and removal from the wheel and to allow for a wider variation in total poundage of the weights to accordingly vary the resultant traction produced to suit any road condition encountered.

Still another purpose of my invention is the provision of wheel which, while possessing all of the above delineated characteristics, has a disk body which not only lends additional strength thereto over that of a spoked wheel, but permits ready casting of the body, hub, and felly forming elements in an integral structure, and in the elimination of spokes dispenses with the accompanying wheel guards used on tractor wheels.

I will describe only one form of vehicle wheel embodying my invention, and will then point out the novel features thereof in claims.

Fig. 1 is a view showing in side elevation one form of vehicle wheel embodying my invention.

Fig. 2 is a view similar to Fig. 1 but enlarged, and looking at the opposite side of the wheel, with one of the weights broken away.

Figs. 3 and 4 are enlarged sectional views taken on the lines 3—3 and 4—4 of Fig. 1 respectively.

Fig. 5 is a fragmentary view on a reduced scale and showing in side elevation one of the inside traction weights shown in Fig. 2, but illustrating the reverse side thereof.

Fig. 6 is an enlarged sectional view of the wheel taken on the line 6—6 of Fig. 1.

Fig. 7 is an enlarged sectional view of one of the felly forming elements.

Fig. 8 is a sectional view taken on the line 8—8 of Fig. 7.

Fig. 9 is an enlarged view of one of the felly forming elements as illustrated in Fig. 2.

In carrying out my invention, I provide a wheel body 15 which is of disk form and preferably made of steel cast integral with a hub 16 the bore of which has a portion 17 of uniform diameter, and another portion 18 which decreases in diameter as it approaches the portion 17 to provide the necessary taper for facilitating insertion of a vehicle axle into the hub. Splines 19 are contained in the bore portion 17 to key the hub to the axle.

As best illustrated in Fig. 2, the wheel body 15 is provided with a felly composed of a plurality of elements E cast integral with or otherwise fixed to the periphery of the wheel body so as to extend laterally therefrom, and arranged at spaced intervals about the circumference thereof. Each felly forming element comprises a plate 20 extending laterally from the wheel body at the inner or vehicle side of the wheel, as shown in Figs. 6 and 7. The side edges 21 of this plate 20 are filleted into the wheel body as shown in Fig. 8 in order to brace and thus lend strength to the plate in its resistance to forces imposed edgewise thereon.

To strengthen the plate radially inward of the wheel body a bracing web 22 is formed integral with the disk 15 and the plate. As best shown in Figs. 8 and 9, the plate is reduced in width at its free end but increased in thickness and beveled on its outer side to form a rim abutment 23. Where the plate 20 joins the disk 15 and for a length corresponding to that of the abutment 23, it is beveled as indicated at 24 in order to receive between a tire rim and the plate, a wedge 25 of a clamp 26.

As will be seen from an inspection of Fig. 2, there is one clamp 26 for each felly element E, and as shown best in Figs. 6 and 7 each clamp has a lip 27 at its inner edge which engages a similar lip 28 on a thickened portion 29 of the disk 15 to brace the clamp and locate it with respect to the corresponding felly forming element. Through the clamp, the thickened portion 29 and a boss 30, is extended a bolt 31 carrying a nut 32 which is operable to move and confine the clamp in its proper rim clamping position. The head of the bolt abuts the inner side of the plate 20 and thus the bolt is secured against turning to facilitate application and removal of the nut.

From the preceding description it will be manifest that the several elements E combine to form a felly to which a conventional form of rim R carrying a pneumatic tire T, can be applied laterally from the outer side of the wheel body, and fixedly secured in position thereon by the application of the clamps 22 and the bolts 31.

As applied the rim engages the several abutments 23 to limit further inward lateral movement of the rim and thus properly and uniformly space the tire T from the side of the vehicle to which the wheel may be applied. Once the rim has been so positioned on the felly elements, the clamps and bolts are applied to force the wedges 25 between the rim and felly elements so that the wedges now coact with the abutments 23 to secure the rim against lateral movement in either direction. Any tendency of the wedges to be ejected by the vehicle load imposed on the rim is effectively resisted by the bolts, nuts and lips 28, and here it will be noted that the lips support the clamps in a manner to prevent transverse bending of the bolts.

The rim as secured on the felly elements, is supported yieldingly or resiliently because, as will be observed from an inspection of Fig. 6, the rim contacts only with the wedges and the abutments, leaving the intervening rim part spaced from the elements to allow the rim to yield inwardly. This adds to the resiliency of the wheel and thereby prolongs the life of the tire. Such a construction and arrangement of parts permits the rim to be made sufficiently large at its inside diameter to render the easy application and removal of the rim to and from the felly elements.

By forming the felly of a plurality of elements E spaced as they are circumferentially on the wheel body, the easy mounting and demounting of the rim is rendered possible. Should the rim be untrue in its roundness even to the extent of having flat spots thereon, the easy mounting of the rim can still be effected because such spacing of the felly elements automatically compensates for any rim irregularities as distinguished from a continuous felly which cannot.

To lock the rim against circumferential shifting on the felly elements and to orient the rim circumferentially on the wheel, the body 15 (Fig. 2) is formed with a peripherial and flanged recess 33 to provide a pair of shoulders 34 at its ends, while the rim R is provided on its inner periphery with a pair of spaced lugs 36 which engage the shoulders in a manner to lock the rim in fixed position circumferentially on the body.

As previously stated herein my invention is particularly applicable to wheels for tractors which use traction weights, although in this adaptation special forms of weights are employed and constitute a part of my invention. As best shown in Fig. 2, two inner traction weights 37, each of semi-circular form, are arranged circumferentially and in opposed relation at the inner or vehicle side of the wheel body 15. The confronting ends of the weights are spaced to accommodate two of those webs 22 which are diametrically opposed.

At their inner or wheel sides the weights 37 are each provided with recesses 38 to receive the bosses 39, a single recess 39 to receive the flange of the recess 33, and radial slots 40 to receive, rather snugly, the remaining webs 22. By the provision of these recesses and slots the weights can lie contiguous to the wheel body, while those webs which engage within the slots 40 serve to locate and support the weights on the wheel body in a manner to resist circumferential forces produced by rotation of the wheel. Also, the flange of the recess 33 engaging within the weight recess 39 aids the webs in this force resisting function.

As will be observed from Fig. 6, the transverse peripherial contour of the weights 37 is such as to accommodate the several felly elements E, but it will be noted that the weights extend radially beyond the inner periphery of the rim in order to increase the total poundage of the weight.

In addition to the traction weights 37 at the inner side of the wheel body my invention also includes traction weights 41 at the outer side thereof. In the present instance, four of these outer weights 41 are shown, and each weight is of semi-circular form, as shown in Fig. 1, with peripherial indentations 42 therein to accommodate the several clamps 26 and lips 28 in a manner to permit access to the nuts 32 when removing the clamps 26 incident to removal of the rim R, and without disturbing the position of the weights.

Registering recesses 43 are formed in the periphery of the four weights 41 (Figs. 1 and 3) for the purpose of permitting the lugs 36 to clear the weights when demounting the rim from the wheel, it being understood that by forming all of the weights with these recesses the weights can be interchanged one with the other in their relative positions on the wheel. V-shaped notches 44 are provided in the weights 41 to form a clearance for the valve stem of the tire, but primarily to permit hanging of the weights on certain of the bolts employed for securing the weights to the wheel to facilitate application of the remaining bolts.

As shown in Fig. 6, the outer periphery of all of the weights 41 are within the area defined by the inner periphery of the rim R in order that the weights as secured to the wheel body will not abut the rim as it is being demounted laterally from the felly element. Further, the recesses 43 permit the lugs 36 to be withdrawn laterally of the weights 41 and without disturbing the position of the weights.

For securing both the inner and outer weights 37 and 41 to the disk wheel body 15, bolts 45 and 45a extend through suitable openings in the wheel body and weights, with the square heads 46 of the bolts reposing within square sockets 47 in the inner weights 37, as shown in Fig. 6. In this manner the bolts are secured against turning to facilitate application and removal of nuts 48 which, as will be understood, coact with the bolts to secure the weights on the wheel body.

In practice, the outer weights 41 may be used alone or in combination with the inner weights, depending upon the amount of traction required, and by constructing the weights in sections of semi-circular form rather than in circular or disk form, they are not only more readily applicable by reason of being lighter, but they permit a wide variation in total weight to accordingly vary the resultant traction produced at the tread of the tire to suit various road conditions.

When using the outer weights alone, each bolt 45a is extended through the wheel body 15 from the back thereof so that its threaded end projects to the outer side of the wheel. With the wheel positioned so that this bolt is lowermost thereon one of the weights 41 is now lifted and positioned so that the projecting part of the bolt passes into the notch 44. Upon releasing the weight it will engage and hang in fixed position on the wheel body to permit the application of the bolts 45 and the nuts 48 for all three bolts in the final fastening of the weight to the wheel. Of course, it will be understood that the other weight section corresponding to the first weight section is applied to the wheel in a similar manner. The succeeding outer weights can be applied to the bolts following the application of the first weights, as will be manifest.

Once the weights 41 are bolted in position on the wheel, the mounting and demounting of the rim and its tire can be readily effected from the outer side of the wheel without removing or in anywise disturbing the fixed position of the weights. Consequently, in the event of a requisite tire change removal of the rim is the only operation necessary in respect to the wheel, to effect such a change, and thus the laborious operation of removing the weights is eliminated.

Although I have herein shown and described only one form of vehicle wheel embodying my invention it is to be understood that various changes and modifications may be made herein without departing from the spirit of my invention and the spirit and scope of the appended claims.

I claim:

1. A disk wheel having rim supporting elements fixed to the periphery thereof, projecting laterally therefrom and arranged at intervals circumferentially thereon; bracing webs fixed to the wheel and to said elements; and a weight secured to the wheel and having slots therein to so receive said webs that the latter aid in supporting the weight on the wheel.

2. A wheel having a disk body; elements fixed to and projecting laterally from one side of said body and arranged at intervals circumferentially thereon; a rim supported on said elements; clamps and bolts for securing the rim on the elements; and a traction weight secured to said body and having slots therein to accommodate and permit access to said clamps and bolts.

3. A wheel having a disk body; elements fixed to and projecting from one side of said body and arranged at intervals circumferentially thereon; a rim supported on said elements; clamps and bolts for securing the rim on the elements; webs on the body and elements for bracing the elements; a traction weight fixed on one side of said body and having slots therein to receive said webs; and a second traction weight fixed on the other side of said body and having recesses therein to accommodate and permit access to said clamps and bolts.

4. A wheel having a body; a rim demountably supported on said body; means carried by said body for securing the rim on the body; and a traction weight secured to said body and having openings therein accommodating and permitting access to said rim securing means in a manner to allow demounting of the rim without disturbing said weight.

5. A wheel having a body; a rim supported on said body to permit demounting thereof from one side of the body; clamps and bolts for securing the rim on the body; traction weights at opposite sides of the body; means extending through the body for securing said weights to the body; the weight at one side of the body having recesses therein to accommodate and permit access to said clamps and bolts whereby said rim can be demounted from the wheel body without disturbing said weights.

6. In combination; a wheel having a body; a rim demountably supported on said body; clamps and bolts for securing the rim on the body; a traction weight; bolts for securing said weight to one side of said body; said weight having a notch therein so situated as to receive one of said weight bolts so that when the wheel is positioned with the said bolt lowermost and the weight placed on the wheel so that the notch receives said bolt, the bolt temporarily supports the weight on the wheel to permit the remaining bolts to be applied and slots to accommodate and permit access to said clamps and bolts.

7. A wheel having a disk body; a rim supported on said body; clamps and bolts for securing the rim on the body; and a traction weight secured to said body and having slots therein to accommodate and permit access to said clamps and bolts.

8. In combination; a wheel having a body; a rim demountably supported on said body; clamps and bolts for securing the rim on the body; a plurality of traction weights; bolts for securing said weights to one side of said body; each of said weights of arcuate form and having indentations in its outer edge to accommodate and permit access to said clamps and bolts, and openings to receive the weight bolts, certain of which openings open to the outer edge of the weight for the purpose described.

LLOYD D. KAY.